United States Patent
Swanson et al.

(10) Patent No.: US 6,610,242 B1
(45) Date of Patent: Aug. 26, 2003

(54) METHOD FOR TREATING POLYMERIC FIBER MATS AND FOR MAKING FILTERS FROM SUCH TREATED FIBER MATS

(76) Inventors: Malcolm Swanson, 2213 Garrett's Chapel Rd., Chickamauga, GA (US) 30707; Ken L. Parris, 8065 Maham Gap Rd., Ooltewah, TN (US) 37363; Winston F. Budrow, 15001 N. Hana Maui Dr., Phoenix, AZ (US) 85022; Alan Smithies, 13028 Flint St., Overland Park, KS (US) 66213

( * ) Notice: Subject to any disclaimer, the term of this patent is extended or adjusted under 35 U.S.C. 154(b) by 81 days.

(21) Appl. No.: 09/853,765

(22) Filed: May 14, 2001

(Under 37 CFR 1.47)

Related U.S. Application Data (60) Provisional application No. 60/247,198, filed on Nov. 13, 2000.

(51) Int. Cl.$^7$ ................................................. B29C 55/00
(52) U.S. Cl. .................. 264/480; 264/257; 264/234; 264/284; 264/288.8; 264/293; 264/342 R; 264/345; 264/48; 264/413; 264/479
(58) Field of Search ................................. 428/359, 370, 428/399; 264/178, 233, 203, 204, 234, 257, 293, 284, 342 R, 288.8, 345, 48, 900, 907, 413, 479, 480

(56) References Cited

U.S. PATENT DOCUMENTS

| | | | |
|---|---|---|---|
| 4,801,502 A | | 1/1989 | Weinrotter et al. |
| 4,871,500 A | * | 10/1989 | Harms et al. |
| 5,120,814 A | | 6/1992 | Seidl et al. |
| 5,132,388 A | | 7/1992 | Seidl et al. |
| 5,181,945 A | | 1/1993 | Bodovsky |
| 5,271,889 A | * | 12/1993 | Weinrotter et al. |
| 5,384,390 A | * | 1/1995 | Schobesberger et al. |
| 5,486,412 A | * | 1/1996 | Weinrotter et al. |

* cited by examiner

*Primary Examiner*—Merrick Dixon
(74) *Attorney, Agent, or Firm*—Chambliss, Bahner & Stophel, P.C.

(57) ABSTRACT

A mat of polymeric fibers is treated to alter a filtration surface by the application of heat and pressure. The filtration surface is heated to a temperature sufficient to soften the fibers and pressure is applied to compact the softened fibers in order to reduce the average pore size on or at the filtration surface.

6 Claims, 6 Drawing Sheets

METHOD FOR TREATING POLYMERIC FIBER MATS AND FOR MAKING FILTERS FROM SUCH TREATED FIBER MATS

CROSS REFERENCE TO RELATED APPLICATION

This application claims the benefit of U.S. Provisional Application No. 60/247,198, which was filed on Nov. 13, 2000.

FIELD OF THE INVENTION

The present invention relates generally to filter media, and more particularly to a method for treating polymeric fibers for use as filter media in the removal of particulates from a gas stream.

EXPLANATION OF TECHNICAL TERMS

As used herein, the term baghouse refers to any of a number of dry filtering devices which operate by passing particulate-laden air or gas through bag-shaped filters to rid the air or gas of the particulate. Baghouses are usually operated at high flow rates or pressures, and the filter bags, which may be formed of various types of filtering media, operate by trapping or collecting the particulate material as it comes in contact with the bag.

As used herein, the term particulate material refers to dust and other particles which are suspended by or entrained in the air or gas which is being passed through the filter or through the baghouse.

As used herein, the terms filter, filter material and filter media refer to a mat of fibers, fabric or other material which is permeable to air or other gases and which is capable of filtering particulate material from the air or gas that is passed through the material.

As used herein, the term mat of fibers refers to a plurality of fibers which are woven, felted, needlepunched or otherwise intertwined in such a manner as to form a unitary structure.

As used herein, the term filtration surface refers to the surface or side of a filter or filter bag which is the first to contact the air or gas which is being filtered thereby.

As used herein, the term pores refers to the spaces or interstices between the fibers which are created by the intertwining of fibers in a mat. The pores may vary in size and shape, and a number of intercommunicating or interconnecting pores may provide one or more passageways for air and gases through the mat.

As used herein, the term average pore size at the filtration surface means the average of the area of the pores on a filtration surface of a mat of fibers. The average pore size at the filtration surface may differ from the average of the pore size within the mat.

As used herein, the terms permeability and flow rate refer to the rate at which a volume of air or other gas may be passed through a filter, per unit of time. The initial flow rate or the initial permeability of a filter is that which exists (and may be measured) prior to the filter's exposure to entrained particulate material in the normal filtering environment. The operating flow rate or the operating permeability of a filter is that which exists (and may be measured) during or after the filter's exposure to entrained particulate material in the normal filtering environment.

As used herein, the term polyimide fibers refers to filaments and fibers comprised of any of a number of flame-retardant, high-temperature resistant compounds of the general formula:

where n is an integer larger than 1, and
A is a tetravalent aromatic group selected from:

and wherein X represents CO, $CH_2$, O, S or $CF_2$, and R is at least one of the following divalent aromatic groups:

As used herein, the term nip rolls refers to at least a pair of rollers having axes that are positioned in such proximity to one another that the outer surfaces of the rollers are close enough to each other to apply pressure to a material which is being passed between them. The axes about which the nip rolls rotate may be capable of being adjusted so that the pressure applied by the nip rolls may be increased or decreased.

BACKGROUND OF THE INVENTION

There are many known applications requiring the filtration of particulate impurities from air or other gases which are derived from industrial processes. A common method for filtering particulate materials from gases involves the use of woven or felted bag filters that are mounted inside a metal structure commonly referred to as a baghouse. In most baghouses, a number of filters are provided, each in the form of a generally cylindrical bag that is closed at one end and fitted over a metal frame. The flow of air or gas within the baghouse is directed from the outside of each bag through the fabric wall of the bag. Consequently, particulate material entrained in the air or gas passing into the baghouse will collect on the exterior filtration surface of each of the bags while the filtered air or gas passes through the fabric wall and into the interior of each bag, and then to a plenum located generally above the bags.

Periodically, a blast of high pressure air may be sent through each bag in a direction opposite to the normal flow, i.e. from inside of the bag out through the bag fabric. Generally, such a high pressure blast is strong enough to dislodge most of the dust or other particles that have collected on the outer (filtration) surface of the bag fabric, although it may not dislodge the dust that has penetrated into the internal pores of the fabric. The dust particles that are dislodged by the air blast will fall to the bottom of the baghouse where they are collected and discharged, most commonly by way of a screw conveyor.

While a number of filter fibers and fabrics are known for use in baghouses, many of these materials are unsuitable for high-temperature applications. More specifically, many of the known filter fabrics are not capable of continuous operation at temperatures at or above approximately 400° F. However, baghouses in many common applications require filtration of hot gases, and often, these gases are introduced to the baghouse at a temperature of 400° F. or higher. One type of material that may be utilized in the manufacture of filters for baghouses where high temperature gases will be encountered is polyimide fiber, which is known to be resistant to high temperatures. A fabric of an aromatic polyimide fiber that is sold for use in filter bags is marketed under the trademark P84 by Lenzing Fibers Corporation of Lowland, Tenn.

Materials made of polyimide fibers are commonly used as insulating and fire extinguishing blankets, and in other products where heat resistance is importance. U.S. Pat. No. 5,384,390 of Schobesberger et al. discloses a composition for heat-resistant, flame-retardant polyimide fibers, and U.S. Pat. No. 5,271,889 of Weinrotter et al. discloses a use of such fibers in the production of molded products. U.S. Pat. No. 5,181,945 of Bodovsky teaches that polyimide fibers can be knitted into a backing, and loose fibers of the same material can be mechanically interlocked into the knitted backing to form a tufted pile. The resulting fur-like fabric may then be used as an air filter in a rotating drum filtering machine.

The selection of a material with suitable thermal properties for baghouse filter applications is not the only problem faced by baghouse filter designers. Most of the filters used in such applications are comprised of fabrics which filter particulate materials from a gas stream by trapping such particulates within the pores between the fibers of the fabric. This results in clogged or blocked pores in and through the fabric and ultimately in a lower air or gas flow rate through the filter bag. Due to the clogging or blocking of the pores in the fabric of conventional filter bags by particulate matter (and the resultant reduced flow rate of air or gas through the bag), it is frequently necessary to use numerous bags and large baghouses in order to achieve the desired filtering efficiency as well as to maintain the required flow of air through the baghouse.

Although a conventional filter may be made of materials having very closely spaced fibers so as to produce a small average pore size within and through the filter in order to increase the amount of dirt or other particulates that may be captured by the filter, the small pore sizes of such filter will also decrease the permeability or the flow rate of air or gas through the filter. This decrease in the flow rate through the filter reduces its efficiency. Furthermore, as the filter begins to accumulate dust in its pores in use, the pores in and through the filter become blocked with collected particulate so that the operating flow rate of air or gas through the filter is further decreased. Therefore, large bags and/or a large number of bags are conventionally required within a baghouse to insure proper flow and cleaning efficiency. The size and/or number of bags which are required is determinative of the size of the baghouse and of the fans which are needed to pass the air into the baghouse and through the filter bags.

It would be desirable if the efficiency of a filter could be increased while minimizing the decrease in the operating flow rate of such filter during use. It would also be desirable if the number and size of the filter bags could be decreased, along with the size of the baghouses required for common filtering applications.

ADVANTAGES OF THE INVENTION

Accordingly, it is an advantage of the present invention to provide an improved filter for use in baghouses or the like, which is treated so as to collect a larger portion of the entrained particulate at the filtering surface. It is another advantage of the present invention to provide an improved filter having an operating flow rate that is closer to its initial flow rate than would be expected in a conventional filter. It is yet another advantage of the present invention to provide a filter which is more efficient than conventional filters and which thereby allows the use of fewer and smaller bags within the baghouse, which in turn allows for a reduction in the size of a baghouse and in the capacity of the fans needed to operate it. Another advantage is that the increased efficiency imparted to filters treated or constructed according to the invention may permit an increase in the rate of flow of dust-laden air into the baghouse. An advantage of a preferred embodiment of the invention is the provision of a laminated filter fabric in which the preferred polyimide material treated according to the invention may be combined with a conventional felt fabric or other known filtering material, supporting substrate or scrim, thereby providing a high-efficiency filter of reduced weight and cost.

Other objects, advantages and features of the present invention will become apparent to those skilled in the art to which the invention relates from an examination of the drawings and the ensuing description.

SUMMARY OF THE INVENTION

The present invention provides a method for making an improved filter for use in dry filtering devices such as baghouses and the like. A mat of polymeric fibers is provided, and a filtration surface of the mat is treated by applying pressure thereto while heating the surface to a temperature sufficient to soften and compact the fibers on the surface of the mat so as to reduce the average pore size at the filtration surface. The treated mat may then be formed into the shape of a filter for use in filtering air and gases, with the treated surface being disposed so as to be the first surface to contact the air or gas which is being filtered thereby.

The reduction in the pore size at the filtration surface of the mat will prevent a significant portion of entrained particulate from penetrating beyond the outer (filtration) surface of the filter mat. Such particles will be retained on or at the filtration surface, and consequently, will not become embedded within the mat. The particulate that is retained on the filtration surface of the filter will not block or clog the internal pores of the mat, and consequently, the improved filter of the invention will exhibit a higher operating flow rate or permeability for gas or air flow when particulate is trapped thereon than will a conventional filter. Furthermore, because the improved filter of the invention tends to retain much of the particulate on or at the surface, these particles may be more readily removed from the mat with a pulse of air in the reverse-flow direction.

Due to the fact that penetration of particulates beyond the filtration surface is significantly reduced in the invention, the thickness of filter media needed for a particular filtering application may be reduced. This allows for a reduction in the thickness and weight of filters made according to the invention, when compared to conventional bags of similar cleaning efficiency. Because of the increased efficiency imparted to filters according to the invention, the filtration surface area, thickness and weight of the filter bags, the number of filter bags in a baghouse and the size of the baghouse itself may be reduced from that required for comparable filtration using conventional filter bags. The invention also contemplates a use of the improved filter media as a laminate that is applied to a conventional filter material, scrim or other appropriate substrate.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout and in which.

DESCRIPTION OF THE PREFERRED EMBODIMENTS OF THE INVENTION

The present invention provides a method for treating a mat of polymeric fibers to improve its efficiency for use as a filter for removing particulate materials from air or gas. The improved filter is created by heating a surface of the mat to a temperature sufficient to soften the fibers at the surface and applying pressure to the heated surface to compact the heated fibers at the surface so as to reduce the average pore size at such surface. The surface that is treated according to the invention is the filtration surface, or the surface of the filter which is intended to be the first surface of the filter that contacts or is exposed to the air or gas to be filtered.

While a number of flexible polymeric fibers may be used in making the mat for use as a filter according to the invention, it is preferred to use a mat made of aromatic polyimide fibers which are rated for continuous use at temperatures of up to about 500° F. Good results have been obtained when the mat has been made of an aromatic polyimide fiber that is sold under the trademark P84 by Lenzing Fibers Corporation of Lowland, Tenn. The fibers can be of any suitable or desirable length or denier. The mat of polyimide fibers is preferably intertwined, such as by needlepunching, in such a manner as to form a uniform structure or mat. Preferably, the mat of intertwined polyimide fibers will comprise a layer of material having a substantially uniform density and thickness.

Figure 1:
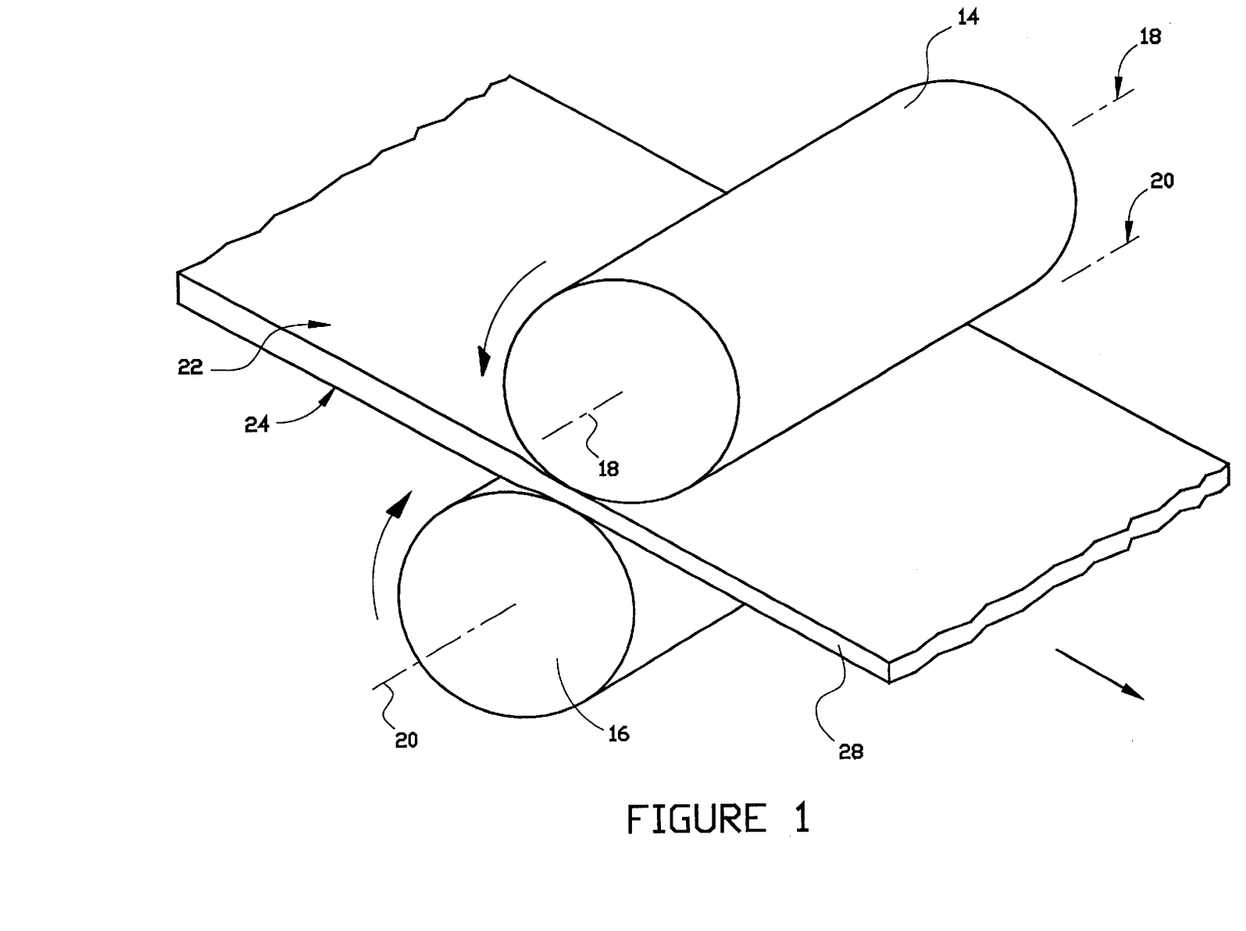
FIG. 1 is a perspective view of a preferred embodiment of an apparatus that may be used in treating the filter media according to the present invention.
Figure 2:
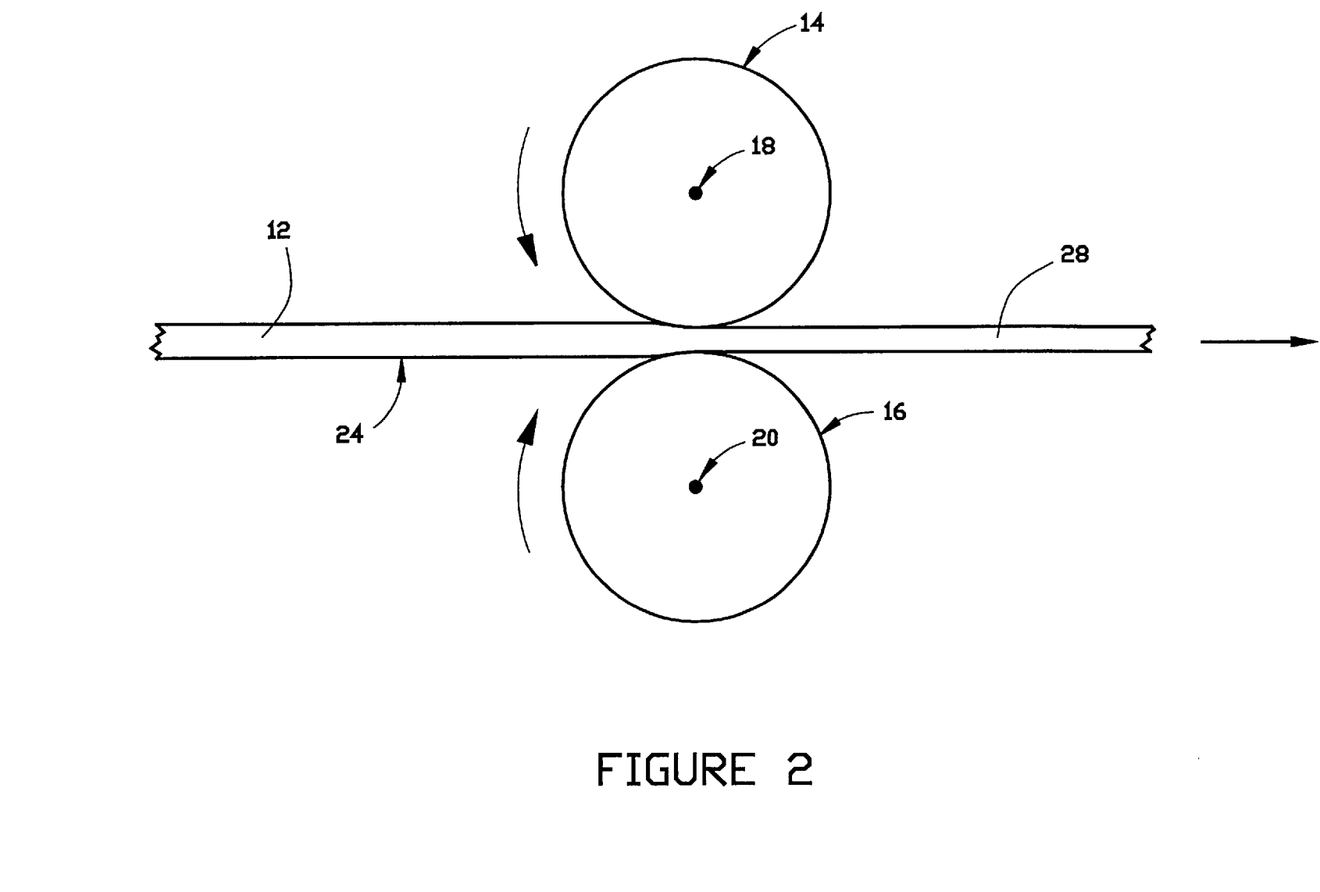
FIG. 2 is a side view of the apparatus of FIG. 1.

A preferred apparatus that may be useful in practicing the invention is illustrated in FIGS. 1 and 2. As shown therein, mat 12 of flexible polymeric fibers is conveyed through a pair of nip rolls 14 and 16, respectively, which are adapted for rotation about axes 18 and 20 respectively. Such rolls are commonly referred to as calender rolls. The axes of rolls 14 and 16 are located so that the nip rolls will apply pressure to surfaces 22 and 24, respectively, of mat 12. One of the pair of nip rolls, preferably upper roll 14, is heated. Such a heated nip roll may be of solid construction with an integral heating element such as an electric induction heater embedded therein, or it may be of hollow construction and contain a heating element and a heat-conducting fluid.

As mat 12 is conveyed between the nip rolls, the fibers at filtration surface 22 are heated to a temperature which is sufficient to cause them to soften. Such softening will make the heated fibers susceptible to deformation upon the application of compacting pressure according to the invention, and such deformation will increase the portion of the filtration surface occupied by the fibers and decrease the average pore size at such surface. When the preferred polyimide material described above is used in the construction of the mat, the fibers at the filtration surface are preferably heated to a temperature within the range of about 600° F. to about 700° F. simultaneously with the application of compacting pressure. It is the combination of heat and compaction that is applied to the filtration surface which results in deformation of the fibers at the filtration surface, and consequently in a reduction in the average size of the pores at such surface. It should be noted that because mat 12 is heated during the compacting process by upper roll 14, it will not be exposed to the heat source for any appreciable period. Preferably, the filtration surface of the mat is heated for no longer than is necessary to soften the fibers on the filtration surface, because it is generally not desirable to reduce the average size of the internal (non-surface) pores within the mat or the pores on or at surface 24.

The pressure applied to the polymeric mat by nip rolls 14 and 16 is preferably within the range of about 300 to about 1500 pounds per linear inch. The application of such pressure is generally sufficient to compact and deform the softened fibers at the filtration surface without affecting in a significant way the fibers or the pores within the mat or those on or at surface 24. Consequently the compaction which is applied within the preferred range will generally alter the pore size only at the filtration surface.

Figure 3:
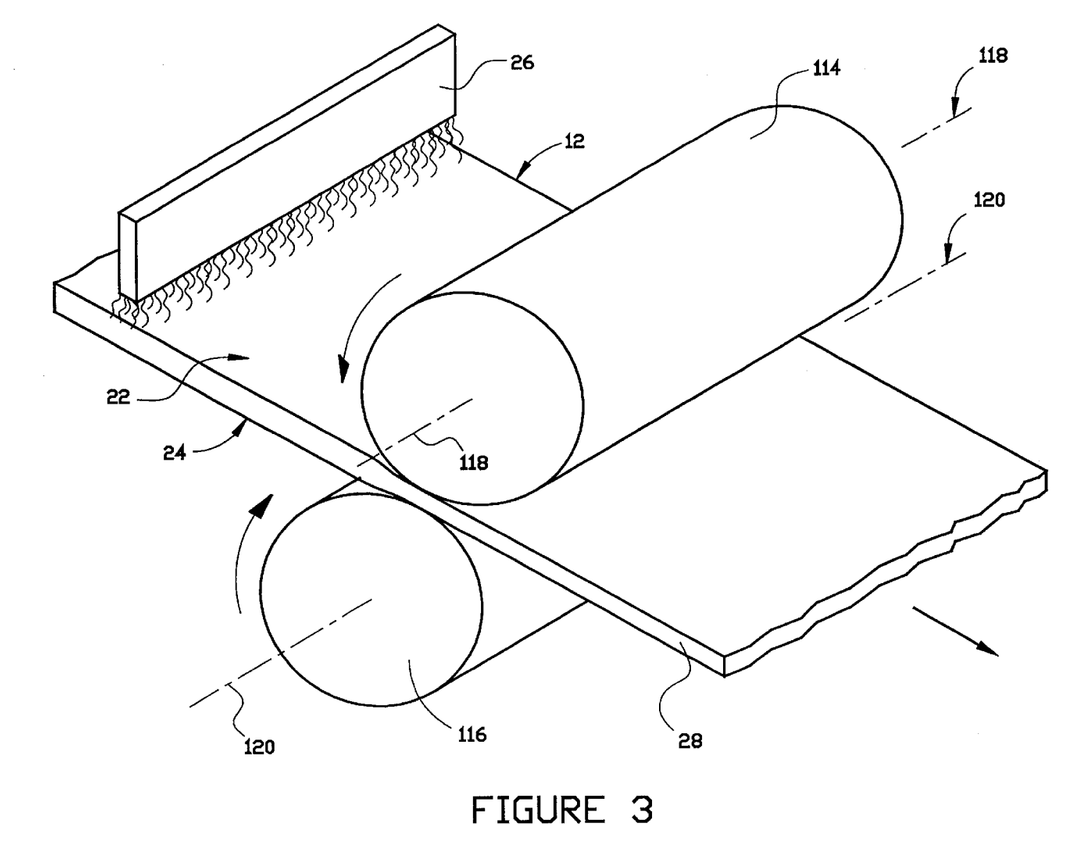
FIG. 3 is a perspective view of another embodiment of an apparatus that may be used in treating the filter media according to the present invention.
Figure 4:
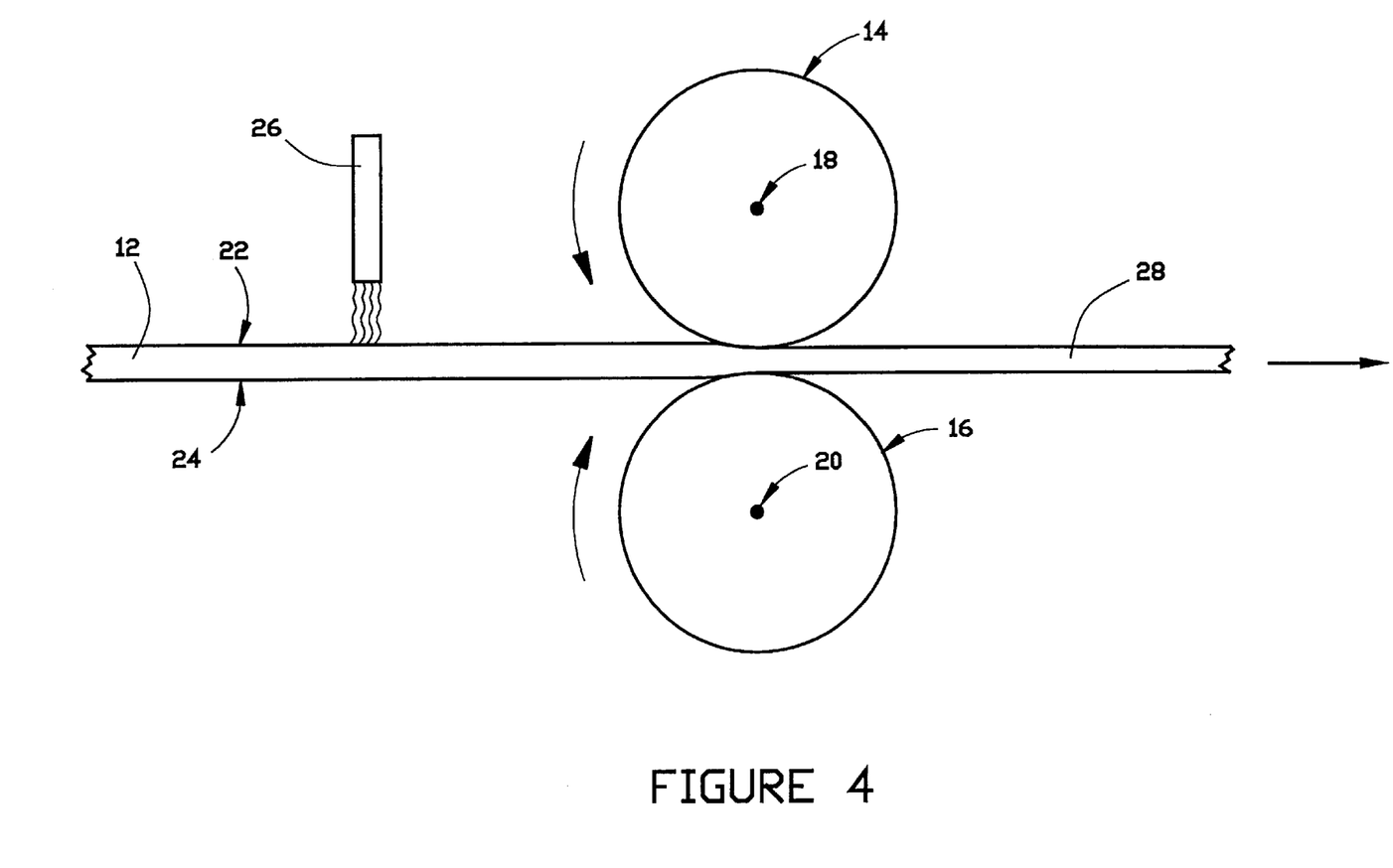
FIG. 4 is a side view of the apparatus of FIG. 3.

FIGS. 3 and 4 illustrate an alternative embodiment of the invention, in which an external heat source 26 is provided to heat surface 22. As shown therein, mat 12 is conveyed through a pair of nip rolls 114 and 116, respectively, which are adapted for rotation about axes 118 and 120 respectively. The axes of rolls 114 and 116, like those of rolls 14 and 16 of the embodiment of FIGS. 1 and 2, are located so that the nip rolls will apply pressure to surfaces 22 and 24, respectively, of mat 12. Located upstream of the nip rolls is heat source 26, by which heat may be applied to filtration surface 22 of polymeric mat 12. As illustrated in FIGS. 3 and 4, heat source 26 is a convection-type heater, although other heating methods and apparatus (such as, for example, a flatbed press) may also be employed to apply heat to surface 22. Mat 12 is preferably exposed to the heat source for no longer than is necessary to soften the fibers on the filtration surface, in order to avoid reducing the average size of the internal (non-surface) pores within the mat or the pores at surface 24.

Figure 5:
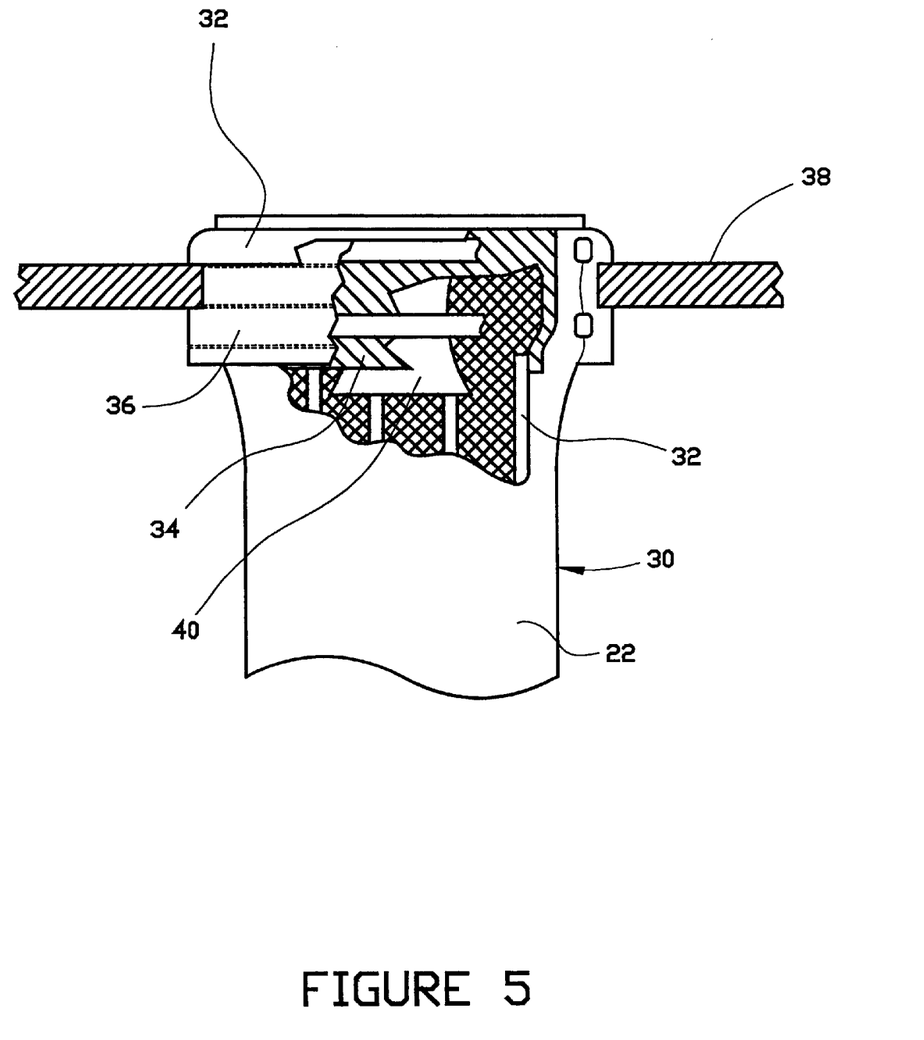
FIG. 5 is a partial cut-away view of a filter bag showing its mounting in a baghouse. The filter bag shown may be made using filtering media treated according to the invention.

After passing between the nip rolls, mat 28, having an altered filtration surface, may be conveyed to a conventional device or a series of devices (not shown) for cutting the mat and shaping and forming the cut portion of the mat into a filter for use in filtering air and gases; where the treated filtration surface 22 is disposed so as to be the first surface contacted by the air or gas to be filtered. The invention is particularly applicable for use in making filter bags 30 (see FIG. 5) which are commonly used in baghouses or the like. As illustrated in FIG. 3, bag 30 fits over a metal frame or bag cage 32 in a baghouse, and is secured in place around tapered collar 34 of cage 32 by fastener 36. The bag is supported in the baghouse by tube sheet 38 and is provided with integral venturi 40. Most filter bags of this type are configured so that the filtration surface 22 is on the exterior of the bag.

The application of heat and pressure to a mat of polymeric fibers as described herein will result in a reduction in the average pore size at the filtration surface of the mat. This reduction in pore size at the filtration surface results in a reduced initial permeability of the mat, as compared to conventional filter materials. A reduction of initial permeability is counterintuitive and would generally be considered undesirable. However, the operating permeability of a filter made according to the invention is surprisingly greater than that of conventional filter materials. Thus, for example, although the initial permeability of a filter made according to the invention is about 20–30% less than that of a conventional filter made of the same type of fibers, the operating permeability of a filter made according to the invention is 20–30% higher than that of a conventional filter of the same fiber. It is believed that the reduction in the average pore size at the filtration surface will permit the capture of many of the larger particles of dust on the filtration surface. Since these larger particles will not therefore penetrate into the filter material and become trapped within the internal pores, the operating permeability of the filter material is not as adversely affected by the reduction in average pore size at the filtration surface as one might expect. The inability of the larger dust particles to penetrate and clog the internal pores of the filter media will allow the air or gas that passes through the filtration surface to flow in a relatively unobstructed fashion through the filter media. Although treatment of filter media according to the invention generally results in more clogging of dust at the filtration surface than in untreated media, the invention surprisingly provides a filter having an operational permeability that is much closer to the initial permeability than is the case with untreated filters.

When treated according to the preferred embodiment of the invention, a polyimide filter will generally collect on its filtration surface the great majority of particles having a diameter of approximately one micron or greater. Most of the particles that are small enough to pass through the pores at the filtration surface will pass through the filter entirely. Furthermore, the particles which are collected on the filtration surface are more readily removed from the filter by a blast of high pressure air (commonly known as "pulse jet cleaning") that is sent through each bag in a baghouse in a direction opposite to the normal flow, i.e. from inside of the bag out through the bag fabric. Generally, this counterflow pressure blast from the inside of the bag is sufficient to dislodge most of the particulate that is collected at the filtration surface of the bag. Since a greater portion of total particulate is collected at the filtration surface (rather than within the bag), the effectiveness of the periodic counterflow cleanings may permit bags made according to the invention to have a longer useful life. In addition, because most of the particulate is collected at the filtration surface, it may be possible to remove the bulk of the particulate by application of a gentle reverse flow (commonly known as "reverse air cleaning") rather than by pulse jet cleaning.

Figure 6:
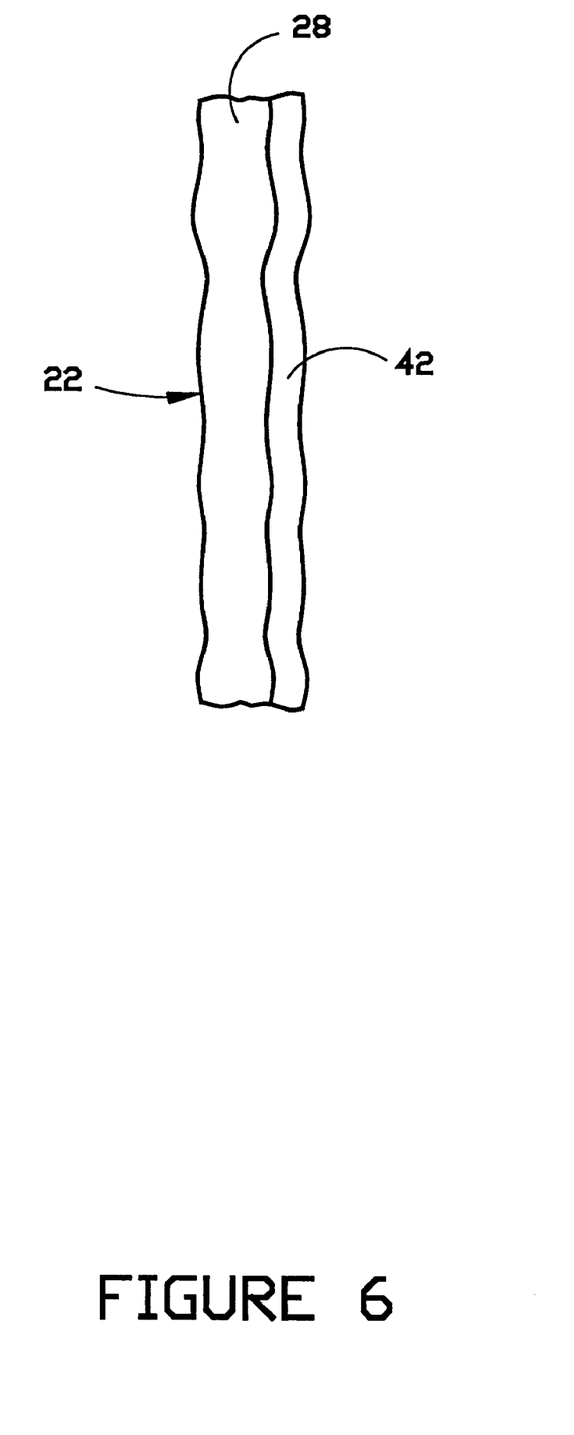
FIG. 6 is a side view of a portion of a filter comprised of a composite of a mat of filter media that has been treated according to the invention and a layer of a reinforcing substrate.

Because the improved filter media of the invention collects most of the particulate at the filtration surface, it is not necessary for the filter fabric to be as thick as in conventional filter bags. Consequently, the structural strength of the filters may be somewhat less than in conventional bags. If greater structural support is desired, the treated filter media of the invention, comprised of mat 28 having filtration surface 22, may be needlepunched or otherwise laminated to a layer of reinforcing substrate 42, as shown in FIG. 6. Such reinforcing substrate will preferably be comprised of conventional filter mats, felts or other filter media, or of mats comprised of fibers selected from a group including, but not limited to, aramid fibers, unmodified polyimide fibers, polyester fibers, and glass fibers. Such reinforcing substrates may be scrim supported or scrimless. It is also possible to use the modified polyimide mat of the invention with only a woven scrim for structural support. Fibers which have been found to be suitable for use in such scrim include polyamides and aramids.

Where a use of a scrim or other substrate is deemed desirable, it is preferred that the scrim or substrate be needlepunched to a mat of polyimide fibers prior to application of heat and pressure to the filtration surface of such mat according to the invention. The advantage to this approach for forming a laminate- or scrim-supported structure is that it avoids needlepunching through the treated filter mat, which may open up some of the pores that have been partially closed by a practice of the invention. Nevertheless, the application of scrim or a reinforcing substrate to a mat of polymeric fibers after such mat has been treated according to the process described herein is also considered to be within the scope of the invention.

Although this description contains many specifics, these should not be construed as limiting the scope of the invention but merely as providing illustrations of the some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A method for treating a mat of polymeric fibers to improve its efficiency for use as a filter, which method comprises:

(a) heating a filtration surface of the mat to a temperature sufficient to softens the fibers at the surface;
(b) applying pressure to the filtration surface of the mat to compact the softened fibers at the surface so as to reduce the average pore size at said surface.

2. The method of claim 1 wherein the polymeric fibers are selected from the group consisting of aromatic polyimide fibers.

3. The method of claim 1 which includes heating the filtration surface of the mat to a temperature within the range of about 600° F. to about 700° F.

4. The method of claim 1 which includes applying pressure to the filtration surface of the mat at a rate within the range of about 300 to about 1500 pounds per linear inch.

5. The method of claim 1 which includes applying pressure to the filtration surface of the mat by passing the mat between a pair of nip rolls.

6. The method of claim 5 which includes heating one of the nip rolls to apply heat to the filtration surface of the mat.

* * * * *